June 14, 1955     J. M. POCHE     2,710,777
BUOYANT STEPPER ATTACHMENT FOR VEHICLE WHEELS
Filed July 25, 1952
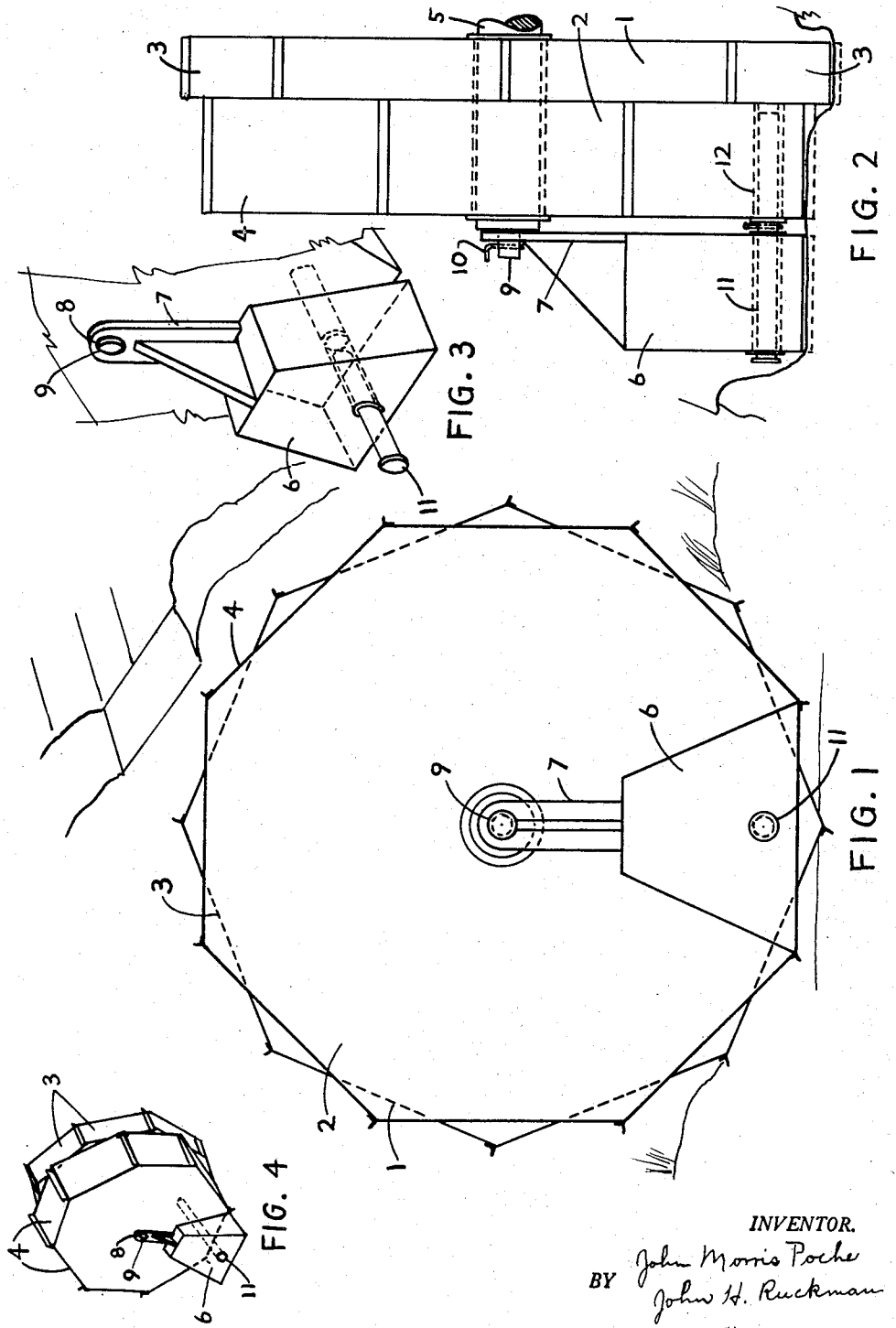
INVENTOR.
BY John Morris Poche
John H. Ruckman
Attorney

United States Patent Office 2,710,777
Patented June 14, 1955

2,710,777

BUOYANT STEPPER ATTACHMENT FOR VEHICLE WHEELS

John Morris Poche, New Orleans, La.

Application July 25, 1952, Serial No. 300,858

1 Claim. (Cl. 301—41)

This invention relates to a buoyant stepper attachment for vehicle wheels. It relates particularly to a device of this character for use in what are commonly referred to as "marsh buggies."

An object in general of this invention is to provide a wheel which is suitable for use with soft boggy terrain and also with firm ground.

A special object is to provide a wheel having a wide section and a narrower section, the two sections being integrally attached to each other in side-by-side relation. The narrow section is intended to improve the travel on firm soil and relieve shocks by minimizing jolts. The wide section is provided for marshy or soft terrain so as to obtain a walking action without cutting through the vegetation or top soil.

Another object is to provide a stepper which may be readily attached to the side of the wheel.

These objects I have obtained by the means which are now to be described in detail and claimed, it being understood that changes in the precise embodiment of invention herein disclosed can be made within the scope of what is claimed without departing from the spirit of the invention.

The novel features which I believe characteristic of this invention are set forth with particularity in the appended claim. The invention itself, however, both as to organization and manner of operation, together with additional objects and advantages thereof will be best understood from the following description of a specific embodiment when read in connection with the accompanying drawing in which, Fig. 1 is a side view of the wheel.

Fig. 2 is an end view of the wheel.

Fig. 3 is a perspective view of an attachable stepper.

Fig. 4 is a perspective view of the wheel and stepper on a reduced scale.

The drawing shows a wheel which has plurality of successive flat portions around its periphery. The wheel which is hollow and therefore buoyant is constructed in two side-by-side integrally united sections 1 and 2. The section 1 is narrower than the section 2. The rim of the section 1 consists of a plurality of successive flat portions 3 angularly related to each other. In the embodiment shown, there are eight of these flat portions. The rim of the section 2 consists of an equal number of flat portions 4. The flat portions 3 and 4 as will be understood from Figs. 1 and 4 are staggered with relation to each other and are not in parallelism. The wheel is rotatably mounted on a fixed axle 5.

A stepper unit 6 which is box-like and preferably buoyant is best shown in Fig. 3. The top of this stepper has an upwardly extending reinforced plate 7 provided with a hole 8, and is adapted to slide over a reduced end portion 9 of the axle, and to be held thereon by a removable pin 10. The lower portion of the stepper has a pin 11 passing therethrough which is adapted to extend into a socket 12 in the wheel and be removably fastened therein.

The operation and advantages of this invention will be apparent in connection with the foregoing description and the accompanying drawing and have already to a considerable extent been stated. The narrow section 1 of the wheel is provided to improve the travel of the wheel when running in firm soil. The wider section 2 is best suited for marshy or soft terrain so as to obtain a walking action without cutting through the vegetation or top soil. The wheel is hollow and buoyant so that it actually floats when any liquid type of terrain is encountered, and its displacement helps to float its weight. The stepper unit 6 is readily attached to and detached from the wheel. This unit gives the wheel a step-like action when extremely soft terrain is encountered because it reaches out beyond the normal path of the wheel so as to increase the traction area of the wheel and also the buoyancy thereof. The stepper is so designed that when in mixed type of terrain, holes, and high spots, the stepper can remain attached to the wheel and still permit the vehicle to travel at high speed. While the wheel is shown with only one attached stepper, it will be understood that more than one can be installed if deemed advisable. While the wheel is shown as having a double octagonal perimeter with sixteen flat portions, the basic idea of construction is the provision of a plurality of such portions and is not confined to any particular number. The number would be determined by the diameter of the wheel since it is obvious that the larger the wheel, the more flats should be provided.

I claim:

The combination of a vehicle wheel, a fixed axle on which said wheel is rotatably mounted, said axle having a reduced end portion extending out from a side of said wheel, a hollow buoyant stepper, a reinforced plate extending from and secured to said stepper and having a hole in its end portion adapted to slide over and be secured to said reduced end portion, and a pin passing through the outer portion of said stepper into a socket in the outer portion of said wheel.

References Cited in the file of this patent

UNITED STATES PATENTS

| 574,752 | Ney | Jan. 5, 1897 |
| 1,284,385 | Linden | Nov. 12, 1918 |
| 2,503,111 | Higgins | Apr. 4, 1950 |

FOREIGN PATENTS

| 617,260 | France | Nov. 19, 1926 |